(12) United States Patent
Kirchhofer et al.

(10) Patent No.: US 7,764,035 B2
(45) Date of Patent: Jul. 27, 2010

(54) ELECTRIC ACTUATOR FOR AIRCRAFT FLIGHT CONTROL

(75) Inventors: Alain Kirchhofer, Salon de Provence (FR); Olivier Honnorat, Aix en Provence (FR)

(73) Assignee: Eurocopter, Marignane (FR)

( * ) Notice: Subject to any disclaimer, the term of this patent is extended or adjusted under 35 U.S.C. 154(b) by 349 days.

(21) Appl. No.: 12/031,059

(22) Filed: Feb. 14, 2008

(65) Prior Publication Data
US 2008/0203859 A1 Aug. 28, 2008

(30) Foreign Application Priority Data
Feb. 14, 2007 (FR) .................................. 07 01086

(51) Int. Cl.
*G05D 3/00* (2006.01)
(52) U.S. Cl. ............. 318/466; 318/400.02; 318/400.08; 318/652; 310/113; 310/309
(58) Field of Classification Search ................. 318/466, 318/607, 652, 400.02, 400.08; 310/113, 310/309
See application file for complete search history.

(56) References Cited

U.S. PATENT DOCUMENTS

| 4,524,313 | A | 6/1985 | Kuno et al. | |
|---|---|---|---|---|
| 6,798,312 | B1 * | 9/2004 | Harris et al. | 333/24.2 |
| 6,809,460 | B2 * | 10/2004 | Okamoto et al. | 310/328 |
| 7,239,097 | B2 * | 7/2007 | Hashimoto | 318/400.08 |
| 7,294,950 | B2 * | 11/2007 | Yoshida | 310/309 |
| 7,479,722 | B2 * | 1/2009 | Takeuchi et al. | 310/113 |
| 7,501,733 | B2 * | 3/2009 | Takeuchi | 310/156.35 |
| 7,501,782 | B2 * | 3/2009 | Buhler et al. | 318/607 |
| 7,586,279 | B2 * | 9/2009 | Theunissen et al. | 318/466 |
| 2003/0174304 | A1 * | 9/2003 | Galburt | 355/72 |

(Continued)

FOREIGN PATENT DOCUMENTS

DE 94 20 887 U1 2/1995

(Continued)

OTHER PUBLICATIONS

French Search Report of 07 01086 filed Feb. 14, 2007.

*Primary Examiner*—Paul Ip
(74) *Attorney, Agent, or Firm*—Young & Thompson

(57) ABSTRACT

The invention relates to an actuator (9) comprising a rotary electric motor (12) a screw Old) driven in rotation by the motor, a mechanical member (15) driven in translation by the screw, a first position sensor (40) sensitive to a position of the electric motor and/or of the screw, a second position sensor (41) sensitive to a position of the mechanical member, and a servo-control circuit (11) connected to both of the position sensors and to the motor, this circuit delivering a power supply signal to the motor that varies as a function of a position setpoint signal (23) and as a function of signals delivered by the two position sensors; the second position sensor presents a resolution that is at least equivalent to the resolution of the first position sensor, and the servo-control circuit includes redundant modules (19, 22) for calculating the position of the mechanical member as a function of the signals/data delivered by the two sensors, together with at least two modules (17, 18) for mutual surveillance of the results delivered by the calculation modules.

11 Claims, 2 Drawing Sheets

U.S. PATENT DOCUMENTS

| | | | | |
|---|---|---|---|---|
| 2004/0189144 A1* | 9/2004 | Gondoh | ................ | 310/309 |
| 2005/0040729 A1* | 2/2005 | Gondoh | ................ | 310/309 |
| 2005/0102045 A1* | 5/2005 | Yoshida | ................ | 700/61 |
| 2005/0104473 A1* | 5/2005 | Yoshida | ................ | 310/309 |
| 2005/0128463 A1* | 6/2005 | Ottens et al. | ................ | 355/75 |
| 2005/0253481 A1* | 11/2005 | Koga et al. | ................ | 310/309 |
| 2006/0113847 A1* | 6/2006 | Randall et al. | ................ | 310/12 |
| 2007/0057595 A1* | 3/2007 | Corredoura | ................ | 310/309 |
| 2007/0114956 A1* | 5/2007 | Hashimoto | ................ | 318/139 |
| 2007/0296367 A1* | 12/2007 | Buhler et al. | ................ | 318/607 |
| 2008/0111512 A1* | 5/2008 | Theunissen et al. | ................ | 318/466 |
| 2009/0018946 A1* | 1/2009 | Waelbroeck et al. | ................ | 705/37 |
| 2009/0026989 A1* | 1/2009 | Kubota et al. | ................ | 318/400.02 |

FOREIGN PATENT DOCUMENTS

| | | |
|---|---|---|
| DE | 296 20 592 U1 | 1/1997 |
| EP | 0 658 832 A2 | 6/1995 |
| GB | 2 094 740 A | 9/1982 |

* cited by examiner

ELECTRIC ACTUATOR FOR AIRCRAFT FLIGHT CONTROL

The present invention relates to a servo-controlled electric actuator for flight control of an aircraft.

BACKGROUND OF THE INVENTION

Such an actuator serves to vary the position of an aerodynamic surface (or member) such as a helicopter rotor blade or an aircraft aileron as a function of a position setpoint signal for said surface, which signal may be delivered by an on-board flight control computer.

The invention applies in particular to an electrical servo-control comprising a rotary electric motor driving a mechanical member in translation via a screw/nut type speed-reducing gear.

The invention applies in particular to an actuator connected mechanically in series with, i.e. interposed between, a flight control member suitable for being actuated by a pilot and the aerodynamic surface of position that is to be adjusted.

The use of such a so-called "series" actuator is described in particular in patent U.S. Pat. No. 4,492,907 where a position servo-control circuit for the actuator includes a circuit for monitoring the position of the member driven by the servo-motor, which position can be measured in particular by means of a potentiometer.

Besides, patent U.S. Pat. No. 5,204,605 describes such an actuator in which the position of the actuator is calculated as a function of signals delivered by Hall effect sensors that are sensitive to the position of the rotor of the actuator's motor, and in which the position corresponding to the mid-point (i.e. half-stroke) of the actuator is detected by another Hall effect sensor.

Since the reliability of systems on board an aircraft is crucial, proposals are also made in patent U.S. Pat. No. 4,434,389 for an aircraft control surface servo-motor in which the stator of the motor includes redundant coils and independent sets of position sensors (Hall effect sensors).

OBJECTS AND SUMMARY OF THE INVENTION

An object of the invention is to propose a "linear" actuator (or servo-motor) that is servo-controlled in position and that presents an increased level of reliability.

The object of the invention is to propose such an actuator or servo-motor that is improved and/or that remedies, at least in part, the shortcomings or drawbacks of known actuators and servo-motors for flight control.

The invention thus applies to an actuator or servo-motor comprising:
  a rotary electric motor;
  a screw arranged to be driven in rotation by rotation of the motor;
  a mechanical member (sometimes known as a "nut") arranged to be driven in translation by rotation of the screw;
  a first position sensor sensitive to at least one position (in rotation) of the rotary electric motor and/or of the screw;
  a second position sensor sensitive to at least one position (in translation) of the mechanical member; and
  a servo-control circuit connected to both of the position sensors and to the motor, said circuit delivering a power supply signal to the motor, which signal varies as a function of a position setpoint signal applied to the servo-control circuit and as a function of the signals delivered by the two position sensors.

In accordance with an aspect of the invention, the second position sensor presents resolution that is at least (substantially) equivalent to, —e.g. close to—, the resolution of the first position sensor, such that these two sensors present redundancy (asymmetry) and the servo-control circuit has a plurality of (at least two) redundant modules for calculating the position of the mechanical member as a function of the signals/data delivered by the two sensors, and also has at least two modules for mutual surveillance of the results delivered by the calculation modules.

By means of the invention, when at least one of the modules for surveillance of the results of position calculation detects a significant difference between the results as delivered respectively by the first calculation module and by the second calculation module, the surveillance module(s) can deliver a fault detection signal; this signal is used to cause the servo-motor to be stopped either in its present position or in some other position.

In the meaning of the present invention, the resolution of the second sensor is at least equivalent to that of the first sensor when the number of measurement data points/items/pulses delivered by the second sensor when the mechanical member is moved over the full stroke of the actuator is substantially not less than the number of measurement data points/Items/pulses delivered by the first sensor for the same displacement of the mechanical member, and in particular is equal to at least twice the second number.

By way of example, if the motor is fitted with two Hall effect position sensors, each delivering one pulse per revolution of the rotor of the motor, if the pitch of the drive screw of the mechanical member is one millimeter, and if the total stroke of the actuator (i.e. of the mechanical member) is 10 millimeters, then said stroke corresponds to 10 revolutions of the motor and consequently to 20 pulses delivered by the (first) Hall effect sensors; under such circumstances, a second position sensor is selected that delivers about 20 pulses, in particular at least about 20 pulses over the full stroke of the actuator.

It is more particularly advantageous for the resolution of the system for measuring the position of the "output" mechanical member of the actuator, —i.e. the second sensor—, to be greater than the resolution of the system for measuring the position of the rotor of She motor, —i.e. the first sensor.

Each of the sensors may comprise one or more sensitive elements. Each of the sensitive elements of the first and second position sensors may output a digital signal or it may output an analog signal.

In a preferred embodiment, the first sensor comprises a plurality of sensitive elements, each delivering a digital signal, while the second sensor comprises a sensitive element delivering an analog signal, i.e. presenting resolution that is "infinite".

This analog-output sensitive element may be constituted in particular by a potentiometer, in particular a "contactlesso" potentiometer, i.e. a potentiometer that does not involve direct contact between an electrically-conductive moving element ("slider") and a likewise conductive stationary element ("track"); such a potentiometer may comprise two substrates secured to the body of the actuator, which substrates are preferably electrically insulating, with at least one of them being deformable, the substrates being elongate, disposed facing each other, and separated by a sheet of an electrically insulating fluid—such as air.

The facing faces of the two substrates present at least one electrically conductive coating, and a movable and optionally conductive slider connected to the "nut" of the actuator is held as it slides over the outside face of the deformable substrate so as to bear "locally" with a force that is sufficient to establish "local" mutual contact between two conductive coatings; such a potentiometer may be as described in utility model DE-9420887.

In another preferred embodiment, the second position sensor may comprise an element that is sensitive to a magnetic field and that delivers an analog output; this element may be a magnetoresistance, in particular an anisotropic magnetoresistance based on ferromagnetic material(s) (in particular iron and nickel alloys) deposited as a thin layer on a substrate, or it may be an analog Hall effect sensor. Such sensors are available from the supplier Honeywell (USA) in particular.

Alternatively or in addition, the second position sensor may comprise an analog-output sensitive element of optical, inductive, or capacitive type, in particular.

In a preferred embodiment, the second position sensor comprises an analog-output sensitive element together with at least one digital-output sensitive element capable of delivering a pulse that corresponds to a determined point on the stroke of the actuator, in particular a point adjacent to one of the two ends of the actuator stroke.

When the aircraft and its flight control system are started, an aircraft computer generally causes the nut of the actuator to take up a determined reference position that is close to the middle of the stroke of the actuator. In a preferred embodiment of the actuator, travel towards this reference position is always performed in a determined travel direction of the nut—and rotation direction of the motor—in order to obviate position-measuring hysteresis phenomena of the kind that can be caused by mechanical slack in the transmission.

When (at least) one sensor comprises a sensitive element that delivers an analog signal, the servo-control circuit includes at least two analog-to-digital converters; each converter has its input connected to the output from the analog sensitive element and its output connected to the (respective) position calculation module.

In particular when a sensor comprises a potentiometer, it is possible to integrate a temperature sensor in the actuator in order to deliver to the calculation module a signal (or a data item) that is representative of the measured temperature, and the calculation module includes an additional module for compensating the position signal delivered from the potentiometer in order to take account of temperature drift in the potentiometer; alternatively or in addition, it is possible to make use of a Wheatstone bridge configuration.

Furthermore, the actuator may include a sensor that is responsive to the magnitude of the current drawn by the motor, which sensor delivers signals where appropriate digitized signals—that can be used by the surveillance modules to detect the end of a mechanical stroke of the actuator or a mechanical fault that causes the motor to draw excessive current.

BRIEF DESCRIPTION OF THE DRAWINGS

Other aspects, characteristics, and advantages of the invention appear in the following description, which refers to the accompanying drawings and which shows preferred embodiments of the invention without any limiting character.

In the present application, unless stated explicitly or implicitly to the contrary, the terms "signal" and "data" are considered as being equivalent.

FIG. 2 corresponds to a first sensor having two sensitive elements with digital outputs, together with a second sensor comprising a single sensitive element with a digital output;

FIG. 3 corresponds to a first sensor and a second sensor having analog outputs;

FIG. 4 corresponds to a first sensor having two sensitive elements with digital outputs, and a second sensor having a single sensitive sensor with an analog output; and FIG. 5 corresponds to a first sensor comprising three sensitive elements with digital outputs, together with a second sensor comprising a sensitive element with an analog output together with two sensitive elements having digital outputs.

MORE DETAILED DESCRIPTION

Figure 1:
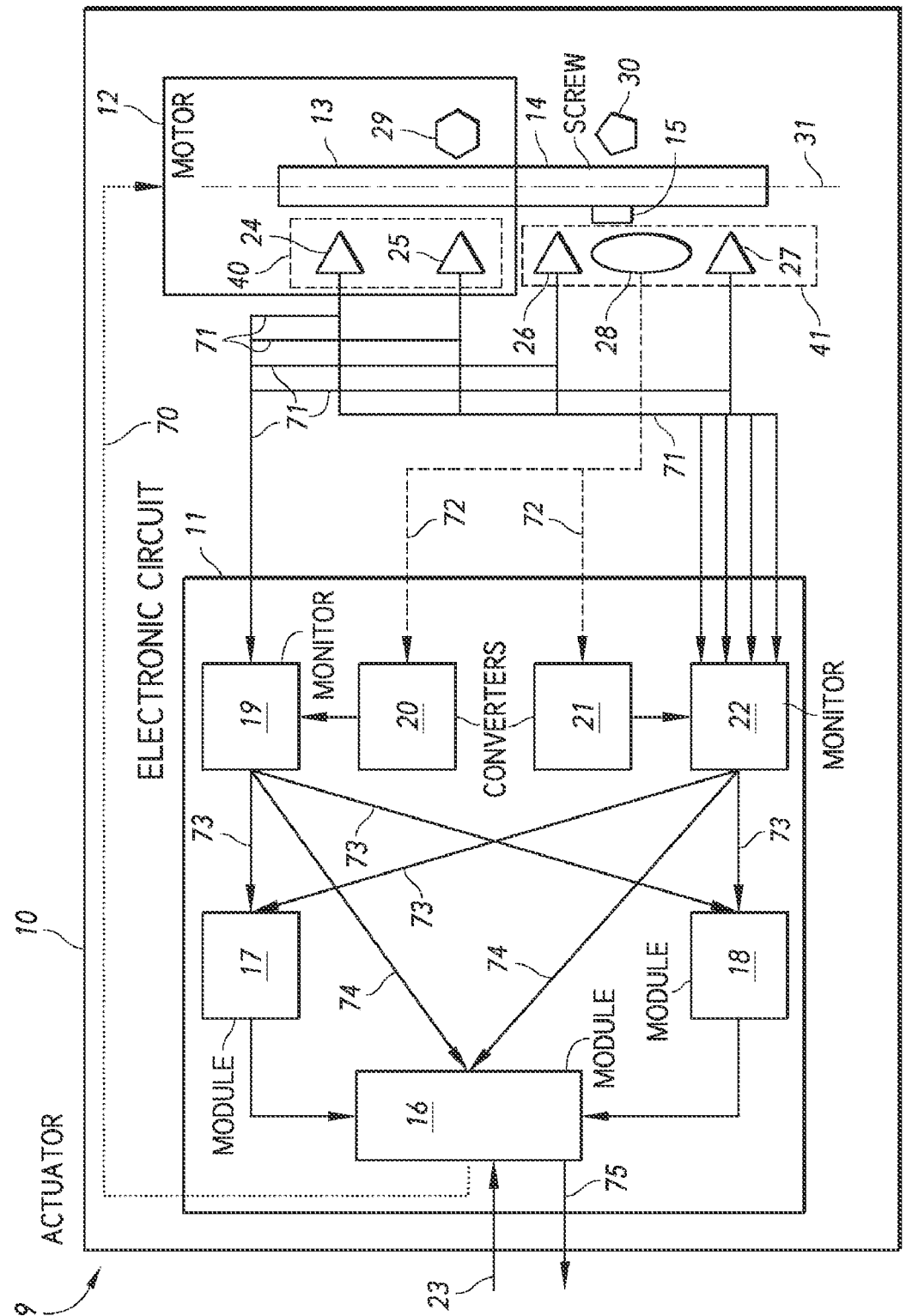
FIG. 1 is a block diagram of an actuator of the invention showing its main components in one embodiment.

With reference to FIG. 1, the actuator 9 comprises a housing 10 receiving a motor 12, a screw 14 driven by the motor, a "nut" 15 driven by the screw, and an electronic circuit 11 for powering the motor 12 and servo-controlling the position of the nut of the actuator.

The nut 15 is connected to the mechanical member (not shown) that is to be driven in translation; it can therefore extend in part outside the housing 10.

The motor 12 has a rotor 13 constrained to rotate with the screw 14, such that the motor 12 acts via its rotor 13 to drive the screw 14 in rotation about the axis 31, and consequently drives the "nut" 15 in translation along the same axis 3.

The motor 12 also has two elements 24, 25 forming a first sensitive sensor 40, which elements are sensitive to position (in rotation) of the rotor 13 and/or of the screw 14, such as Mall effect sensors that deliver respective digital signals.

The motor 12 also has a sensor 29—such as an inductive sensor—that is sensitive to the magnitude of the power supply current delivered by the circuit 11 to the motor 12 via a connection 70.

Figure 3:
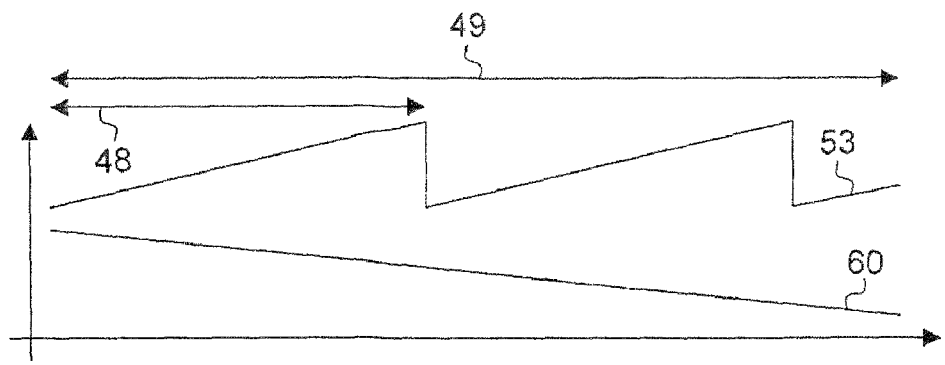
Figure 4:
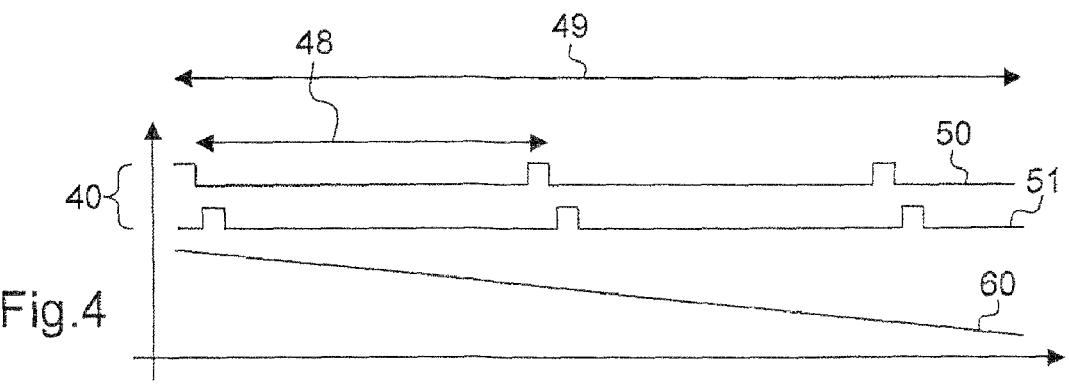
Figure 5:
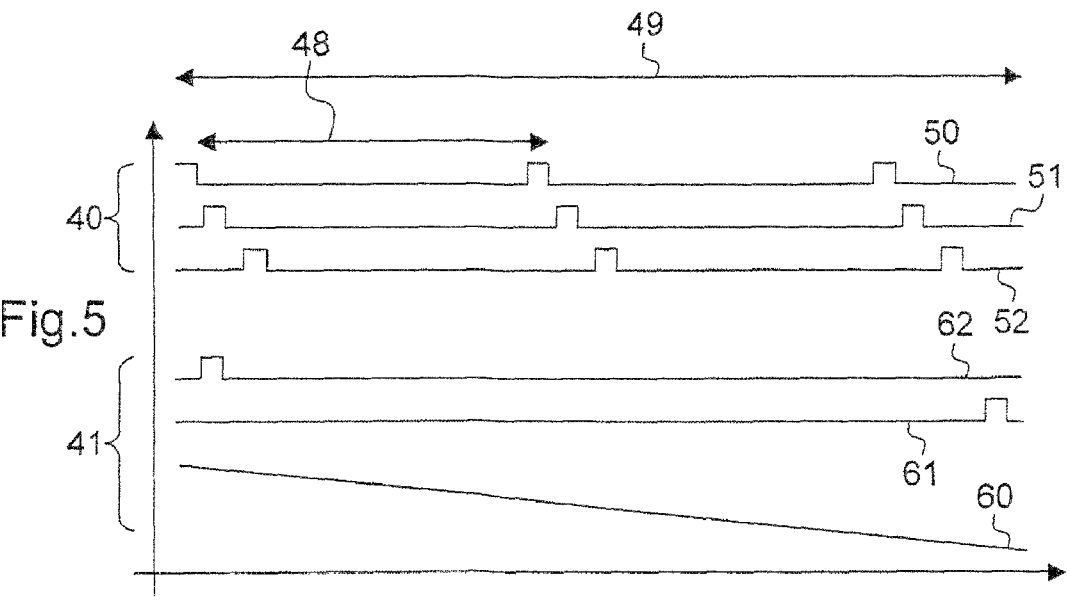

The actuator 9 also has three elements 26, 27, and 28 each of which is sensitive to the position (in translation) of the "nut" 15 along the axis 31; these three elements form a second position sensor 41, the elements 26, 27 delivering respective digital signals referenced 61, 62 in FIG. 5, while the element 28 delivers an analog signal referenced 60 in FIGS. 3, 4, and 5.

The circuit 11 has two analog-to-digital converters 20, 21, two circuits or module 19, 22 for calculating the position of the "nut" 15 along the axis 31, two circuits 17, 18 for monitoring the results of the calculations delivered by the modules 19, 22, and also at least one circuit or module 16 for controlling the motor 12 and providing an interface with a controller (not shown) for controlling the actuator.

Each of the digital-output sensitive elements 24 to 27 is connected to one input of each of the two circuits 19, 22 via a respective connection 71, and the sensor 28 is connected to one input of each of the converters 20, 21 via a connection 72.

The position data delivered by the sensor 28 and digitized by the converter 20 is delivered to the input to the circuit 19, and the same data digitized by the converter 21 is delivered to the input of the circuit 22. Each of the modules 19, 22 determines data that is representative of the position of the "nut" 15 as a function of the signals/data delivered by the two position sensors: the digital signals are integrated and the signals from the two sensors 40, 41 are compared where appropriated after being integrated; these two position data items as calculated as delivered respectively at the outputs of the modules 19 and 22 are applied as inputs to each of the two modules 17, 18 via connections 73.

When a difference between the two position data items as calculated and determined by the respective modules 17, 18 exceeds a determined threshold, the corresponding module outputs an error detection data Totem that is sent to the module 16 for forwarding to the (external) controller via a connection 75.

Otherwise, the two calculated position data items are delivered to the module 16 via connections 74, are combined ("averaged") by the module, and are compared with a position setpoint data item received as input to the module 16 over a connection 23; this module generates a control signal (or power supply signal) for the motor as a function of the result of the comparison, and it delivers this control signal to the motor 12 via the connection 70.

The signals or data delivered by the current sensor 29 and a temperature sensor 30 integrated in the actuator, as delivered to the calculation circuits 9, 2 via connections, —and where appropriate via analog-to-digital converters—that are no shown, serve respectively to detect a mechanical failure and/or the arrival of the nut in an abutment (end-of-stroke) position, and where appropriate to compensate for temperature drift in at least one or the sensors 24 to 28.

With reference to FIGS. 2 to 5, the abscissa or X axis represents the position of the nut 15 along the axis 31, with the distance 49 representing the stroke of the actuator, with the distance 48 corresponds to the portion of the stroke that Is traveled when the rotor of the motor makes one complete revolutions.

Figure 2:
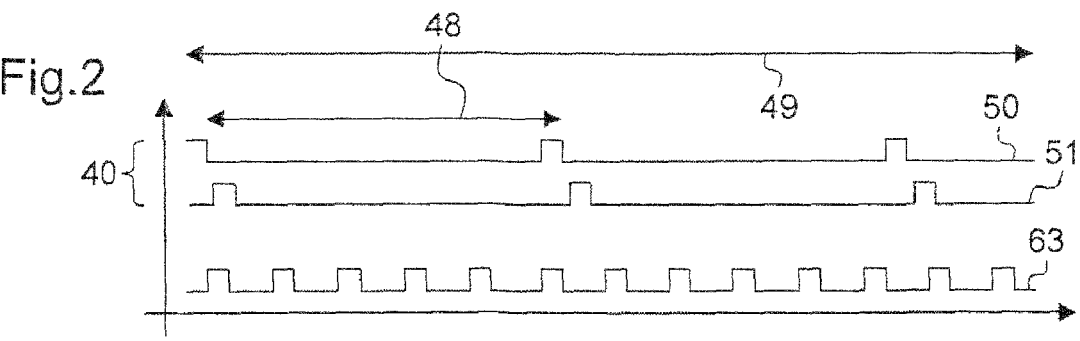
FIGS. 2 to 5 are timing charts showing the signals delivered by the sensitive elements of a first position sensor and of a second position sensor, in various embodiments of the invention.

With reference to FIG. 2, each of the digital signals 50, 51 delivered respectively by the two sensitive elements of the first sensor 40 comprises one pulse per revolution of the rotor; the sensor 40 thus delivers six pulses for the entire stroke of the actuator; this number of pulses—and thus the resolution of the sensor 40—is smaller than the number of pulses (13 pulses in this example) in the signal 63 delivered by the sensitive element of the second sensor or the complete stroke of the actuator.

In the embodiment corresponding to FIG. 3, the first sensor is constituted by a single sensitive element outputting an analog signal 53, e.g. a rotary potentiometer, and the second sensor is constituted by a single sensitive element outputting an analog signal 60, such as a linear potentiometer; the resolution of each of these two sensors is thus "infinite".

FIG. 4 corresponds to a configuration in which the first sensor 40 comprises two digital-output elements 50, 51, as in FIG. 2, while the second sensor includes one analog-output element 60, as in FIGS. 3 and 5.

FIG. 5 corresponds to a configuration in which the first sensor 40 comprises three digital-output elements 50, 51, 52, while the second sensor comprises an analog-output element 60 together with two digital-output elements 61, 62. Each of these two digital elements outputs a pulse whenever the nut/slider 15 comes close to one of the two ends/abutments for the stroke of the actuator.

What is claimed is:

1. An actuator (9) comprising a rotary electric motor (12), a screw (14) arranged to be driven in rotation by rotation of the motor, a mechanical member (15) arranged to be driven in translation by rotation of the screw, a first position sensor (40) sensitive to at least one position of the rotary electric motor and/or of the screw, a second position sensor (41) sensitive to at least one position of the mechanical member, and a servo-control circuit (11) connected to both of the position sensors and to the motor, said circuit delivering a motor power supply signal that varies as a function of a position setpoint signal (23) applied to the servo-control circuit and as a function of the signals delivered by the two position sensors, wherein the second position sensor presents a resolution greater than the resolution of the first position sensor such that these two sensors present redundancy, and the servo-control circuit includes redundant modules (19, 22) for determining the position of the mechanical member as a function of the signals/data delivered by the two sensors, together with modules (17, 18) for mutually monitoring the results delivered by the calculation modules.

2. An actuator according to claim 1, in which the resolution of the system for measuring the position of the "output" mechanical member of the actuator is substantially double the resolution of the system for measuring the position of the rotor of the motor.

3. An actuator according to claim 1, in which at least one of the first and second sensors includes a plurality of sensitive elements (24 to 28).

4. An actuator according to claim 1, in which the first sensor (40) comprises a plurality of sensitive elements (24, 25) each delivering a digital signal, while the second sensor (41) comprises a sensitive element (28) delivering an analog signal, the servo-control circuit including at least two analog-to-digital converters (20, 21), each converter having its input connected to the output of the analog sensitive element and its output connected to one of the position calculation modules.

5. An actuator according to claim 1, in which the second sensor comprises a contactless potentiometer.

6. An actuator according to claim 1, in which the second sensor comprises a potentiometer having two substrates, at least one of which is deformable, the substrates being elongate, disposed mutually facing each other, and separated by a sheet of an electrically insulating fluid, the facing faces of the two substrates presenting at least one electrically conductive coating.

7. an actuator according to claim 1, which a temperature compensation member (30) is integrated in the actuator comprises an element sensitive to a magnetic field and having an analog output.

8. An actuator according to claim 1, in which the second sensor comprises an element sensitive to a magnetic field and having an analog output.

9. an actuator according to claim 1, in which the second sensor comprises an anisotrophic magnetoresistance.

10. An actuator according to claim 1, in which the second sensor comprises an analog-output sensitive element of optical, inductive, or capacitive type.

11. An actuator according to claim 1, in which the second position sensor comprises an analog-output sensitive element (28) together with at least one digital-output sensitive element (26, 27) capable of delivering a pulse (61, 62) corresponding to a determined point in the stroke (49) of the actuator, in particular a point close to one of the two ends of the stroke of the actuator.

* * * * *